Aug. 21, 1956  H. REID  2,759,541
FLAT EDGE TRIMMER WITH AN INTERNAL SHEARING PUNCH
Filed July 6, 1954  12 Sheets-Sheet 6

Fig. 6

Inventor:
Henry Reid,
By.
Attorney.

Aug. 21, 1956          H. REID          2,759,541

FLAT EDGE TRIMMER WITH AN INTERNAL SHEARING PUNCH

Filed July 6, 1954          12 Sheets-Sheet 7

Inventor:
Henry Reid,

Aug. 21, 1956     H. REID     2,759,541

FLAT EDGE TRIMMER WITH AN INTERNAL SHEARING PUNCH

Filed July 6, 1954     12 Sheets-Sheet 9

Inventor:
Henry Reid,
By Harry B. Cook
Attorney.

Inventor:
Henry Reid

Fig. 14

United States Patent Office 2,759,541
Patented Aug. 21, 1956

2,759,541

FLAT EDGE TRIMMER WITH AN INTERNAL SHEARING PUNCH

Henry Reid, West Orange, N. J.

Application July 6, 1954, Serial No. 441,375

15 Claims. (Cl. 164—47)

This invention relates in general to a machine for performing cutting operations upon sheet metal articles, and more particularly the invention is directed to a machine for trimming the edges and punching or notching the walls of thin-walled articles, such as cans, cups, boxes and covers, especially such articles having irregular edges formed by pressing or drawing sheet metal blanks or by extrusion.

Known machines of this general character are cumbersome, unwieldly and expensive structures that require large space, excessive maintenance and servicing, as well as exceptional skill in their operation and set-up. Regardless of the type of work piece, the size of known machines is out of proportion to the work accomplished; for example, a small work piece will be trimmed on a machine of the same size required by another substantially larger work piece.

The vast majority of work pieces are of relatively small size, and one object of the invention is to provide a novel and improved machine construction which can be embodied in a series of machines graduated in size in proportion to the work pieces to be operated upon.

Another object is to provide such a machine which shall be easy to operate, inexpensive in construction and operation, light in weight, and which shall economically fabricate the work pieces.

A further object is to provide a machine of the character described which shall be capable of trimming relatively large work pieces as compared to the size of the machine.

A still further object is to provide a compact and portable machine that is readily adaptable to any convenient work position and so constructed that it may be conveniently stored when not in use.

Machines of this type generally include a main frame having a punch and die on two relatively movable parts, respectively, at least one of which is mounted on the main frame, and the insertion and removal of the work piece into and out of position between the punch and die and the changing of the punch and die is difficult and often dangerous. Therefore, another object of my invention is to provide in machines of this character a main or supporting frame and a work head carrying both the punch and die and tiltably mounted on the supporting frame to permit convenient and rapid insertion and removal of the punch and die and the work piece and to provide for gravity discharge of the work piece after it has been trimmed.

In many known machines the work piece is held in position between cutting members such as the punch and die, under constant pressure from a source of power that is secondary to the power source which actuates the punch or die; and therefore it is another object of the invention to provide in a machine of the character hereinabove described novel means to position and lock the work piece in work-trimming relation without constant application of heavy pressure by power from a secondary source.

Other objects, advantages and results of the invention will be brought out by the following description in conjunction with the accompanying drawings in which.

Generally describing the illustrated embodiment of the invention, the machine includes a main frame A and a secondary frame B which may be a part of the main frame but is preferably pivotally connected to the main frame to swing about a horizontal axis C. At the lower end of the secondary frame B is a punch generally designated D with which cooperates a die E that is mounted on a combined die support and work-piece clamp which is generally designated F and is movable away from the punch to permit the insertion and removal of work pieces G and is movable toward the punch to clamp the work pieces in a position to be operated upon by the punch and die. The punch is movable in its own plane which during operation of the machine is preferably horizontal, and the punch has a cutting edge 1 to cooperate with a cutting edge 2 on the die when the punch is so moved. The punch is actuated by driving means generally designated H above the punch, and the combined die support and work clamp is mounted for movement into and out of work-operating position by mechanism including rack bars 3 that are vertically slidably mounted in bearings 4 in the secondary frame and mesh with the respective gears 5 which are fast connected to a horizontal shaft 6 which is journaled in the secondary frame. The shaft 6 has a pinion 7 fast connected thereto and adapted to be drivingly connected to a mechanism generally designated I which includes a hand crank 8 for applying force to the movement, but might be automatically driven, for moving the die support and work clamp into work operating position and for locking them in said position.

The driving means for the die also includes a clutch J for connecting and disconnecting the punch to and from a prime mover, in combination with mechanism for automatically starting the punch when the work is clamped in work-operating position and for automatically stopping the punch after a predetermined cycle of operation.

Figure 13:
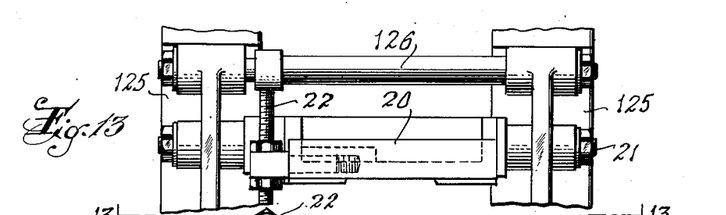
Figure 13 is a fragmentary rear elevational view from approximately the plane of the line 13—13 of Figure 2, illustrating only portions of the motor supporting platform and the adjusting means therefor.

More specifically describing the invention, the main frame A is shown as comprising a base portion 9 which may be in the form of two C-clamps and has clamping screws 10 for fastening the frame on the edge portion of a bench or the like K. Upstanding from the base portion are two horizontally spaced standards 11 each of which has a split bearing 12 for the respective trunnions 13 and 14 that are connected to the secondary frame B (Figure 8) to tiltably mount the secondary frame on the main frame. The trunnions have coaxial openings therethrough in which is journaled a driving shaft 15 to which is connected a pulley 16 that is driven by a belt 17 (Figures 1, 7 and 13) from a variable pitch pulley 18 on the shaft of an electric motor 19 which is secured to an adjustable motor support 20 that is pivotally mounted at 21 on the base portion of the main frame and can be adjusted by a screw 22 to vary the tension of the belt 17 in known manner. The broken lines 23 in Figure 1 indicate two positions of the motor in addition to the position illustrated by solid lines, thus permitting variable speeds of shaft 15 through changing the pitch of pulley 18.

Mounted on and driven by the shaft 15 is a worm 24 which meshes with a worm gear 25 that is rotatable relatively to a tubular vertical countershaft 26 that is journaled in a roller bearing 27 in a bearing block 28 which is removably secured by screws 28a in an opening 29 in a partition 30 that is common to upper and lower recesses 31 and 32 of the secondary frame that open through the respective ends of the frame. The upper recess 31 is normally closed by a combined cover and bearing plate 33 in which the shaft 26 is also journaled. Cooperating with the gear 25 is the clutch mechanism J that includes a clutch element 34 connected to the gear and another clutch element 35 that is keyed to the shaft 26 for movement longitudinally of the shaft and is normally influenced into engagement with the clutch element 34 by springs 36. Means hereafter to be described is provided for causing engagement of said clutch elements simultaneously with the clamping of the work piece in work-operating position and for disengaging the clutch elements after a predetermined period of time or cycle.

Figure 5:
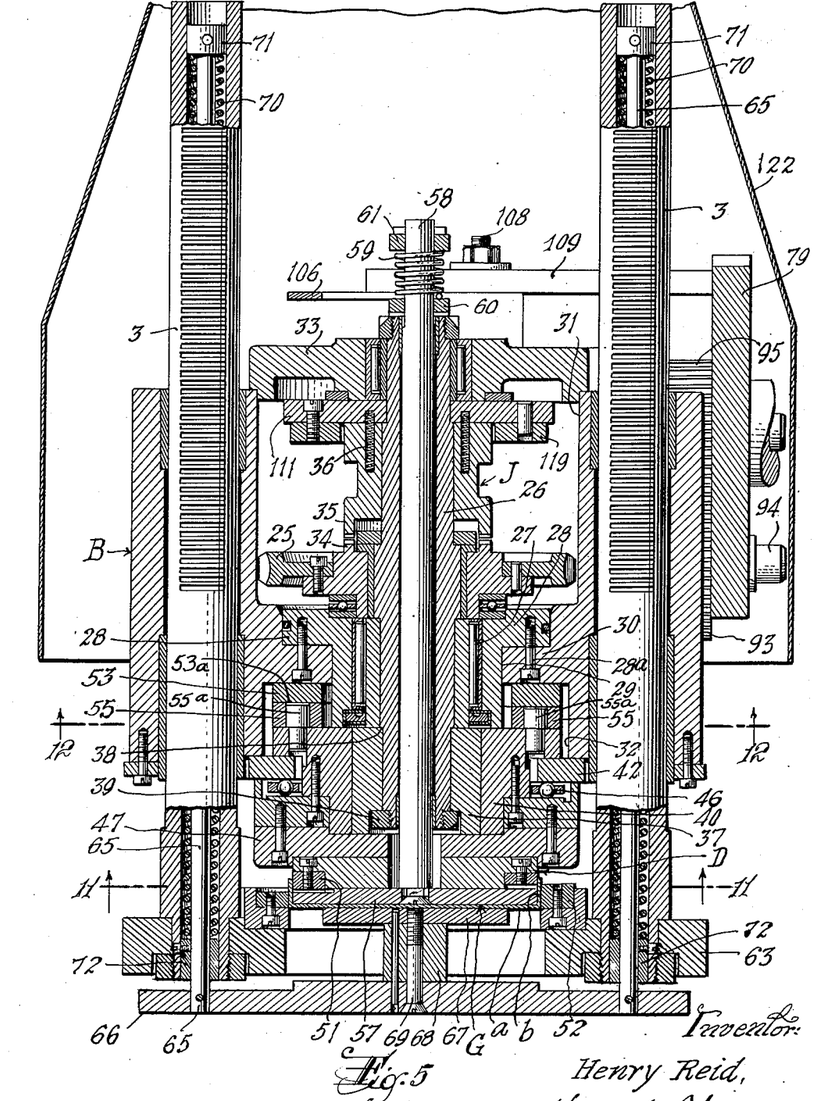
Figure 5 is a vertical sectional view of the work head, with portions shown in elevation, taken approximately on the plane of the line 5—5 of Figure 4.
Figure 6:
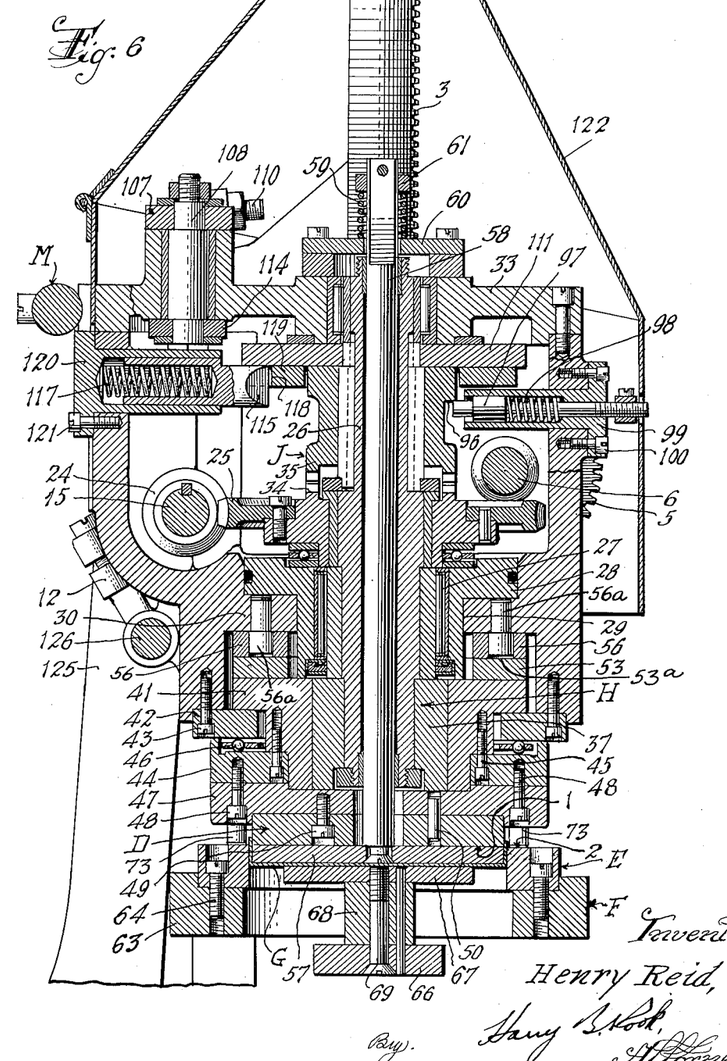
Figure 6 is a central transverse vertical sectional view of the work head, with a portion of the supporting frame shown in side elevation.

It will thus be seen that while the motor 19 is running, the gear 25 will be continuously driven and that when the clutch elements 34, 35 are engaged, the shaft 26 will be rotated. At the lower end of the shaft 26 a cam 37 is fast secured to the shaft between a shoulder 38 on the shaft and a nut 39 secrewed onto the end of the shaft. The cam 37 cooperates with an annular follower 40 the upper end of which has a flange 41 that is disposed at one side of a support ring 42 which is secured to the secondary frame by cap screws 43. At the opposite side of the support ring 42 a bearing ring 44 is screwed to the follower by screws 45 and preferably a thrust ball bearing 46 is interposed between the bearing ring 44 and the support plate 42. A punch-carrying plate 47 is secured to the bearing ring 44 by screws 48 and the punch D is fastened to the plate 47 by screws 49 and positioning pins 50. The punch is shown of circular shape but it may be of any desired form to suit the contour of the work piece. In the present instance the work piece G is cup-shaped, having a base portion a and an annular wall b and the die is a circular annulus. When it is desired to punch or notch the annular wall, a suitably shaped punch or lug, respectively, may be fixed on the punch D to cooperate with a corresponding hole or groove in the die E. As shown on the drawing, there are two lugs 51 to cooperate with complementally shaped blocks 52 on the die. While the form of the cam and the follower may be varied, preferably they are of the same nature as the cam and follower shown in my copending application Serial No. 336,219, filed February 11, 1953. The punch is moved in successive cycles, each cycle comprising a plurality of steps in succession in the same direction around the axis and each step consisting of a movement of the punch along a straight line radial to the die and to and from a central position concentric with the die. In Figures 5, 6 and 15 the punch is shown in said central position, while in Figure 14 the punch is shown as moved from the central position and performing a cutting operation on the work piece.

Figure 10:
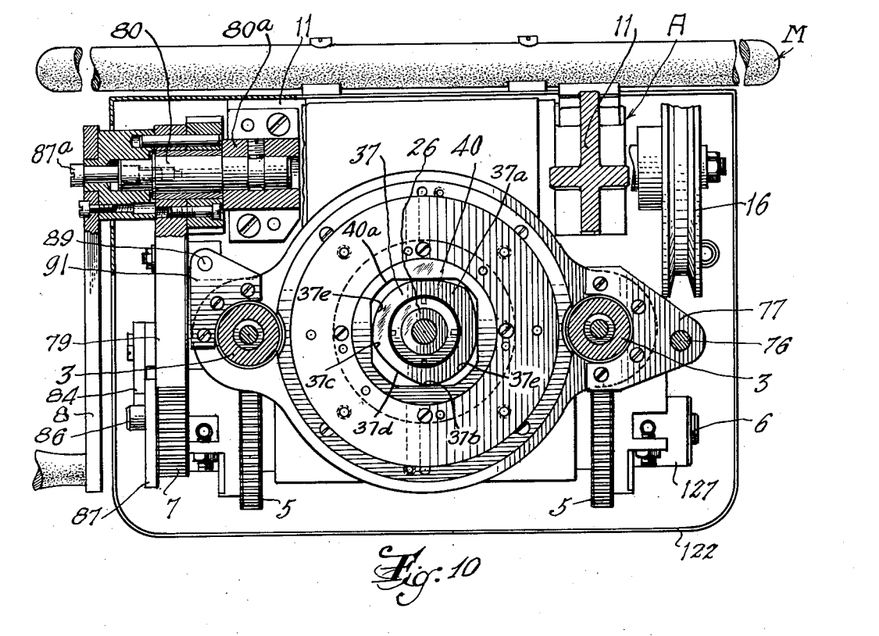
Figure 10 is a horizontal sectional view approximately on the plane of the line 10—10 of Figure 1, looking upwardly from the bottom of the machine and showing particularly the work-holder elevating mechanism and the cam for actuating the trimming punch.
Figure 12:
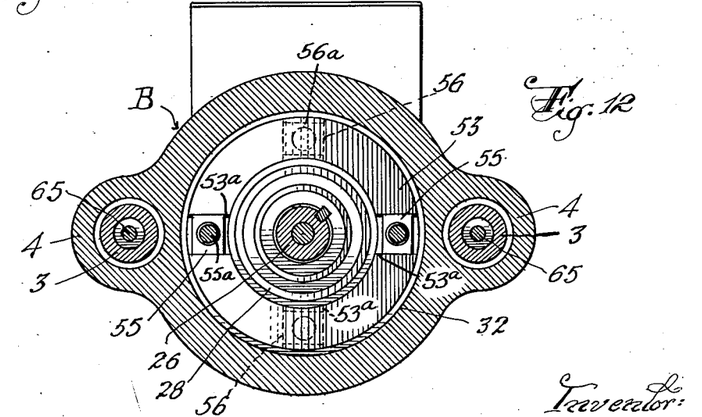
Figure 12 is a fragmentary horizontal sectional view approximately on the plane of the line 12—12 of Figure 5, illustrating the guide member for the polygonal follower of the punch-actuating cam.

Any suitable means may be utilized for mounting and actuating the follower to actuate the punch in the manner described. The cam follower 40 is shown (Figure 10) as having a square opening with rounded corners 40a and the cam 37 has one primary lobe 37a and two complementary lobes 37b and 37c contoured to coact with the side walls of the square opening upon rotation of the cam and move the follower along a straight line from and to a central position concentric with the axis of rotation of the cam each time the primary lobe is moved successively into and out of contact with any side wall of the follower opening, respectively, and the periphery of the cam also has a curved surface 37d and two concentric surfaces 37e contoured for engagement with each side wall of the follower opening during said movement of the primary lobe to prevent all other movement of said follower in directions radial to said axis. A grooved guide ring 53 (Figures 5, 6, 12 and 15) and pairs of blocks 55 and 56, all of known construction, guide the follower and punch in straight lines perpendicular to the respective side walls of the follower opening. More particularly, the blocks 56 are mounted by pins 56a on the secondary frame at diametrically opposite sides of the axis of the shaft 58 while the blocks 55 are mounted by pins 55a on the follower (Figure 5) at diametrically opposite sides of the axis of said shaft and in a diametral plane perpendicular to the diametral plane of the blocks 56 (see Figures 6 and 12). The guide ring 53 is disposed between the two sets of blocks 55 and 56 and has grooves 53a in which the respective blocks are respectively slidably fitted. With this construction, when the follower is urged to the right or to the left of Figures 5 and 10, the follower may slide along the blocks 55 on the ring 53, the ring being held against movement in that direction by the blocks 56, while when the follower is urged upwardly or downwardly in Figure 10 or to the left or to the right of Figure 6, the follower will slide along the ring 53 guided by the blocks 56, the ring being held against movement with the follower by the blocks 55.

A filler 57 carried by a rod 58 that extends through the countershaft 26 is normally held in abutting relation to the lower face of the punch by a compression spring 59 interposed between bridge bar 60 on the top of the cover plate 33 and a collar 61 on said rod, said filler plate being variable in depth or thickness to correspond to the depth of a given work piece to be operated upon. In Figures 1–6 inclusive the filler is a relatively thin disk, to cooperate with the shallow work piece G, while in Figures 14 and 15 the filler 62 is in the form of a deep inverted cup to cooperate with the deep cup-shaped work piece L. It will be seen that in both forms of the invention the filler serves to accurately locate the edge of the annular wall of the work piece in proper relation to the cutting edges of the punch and die.

Figure 9:
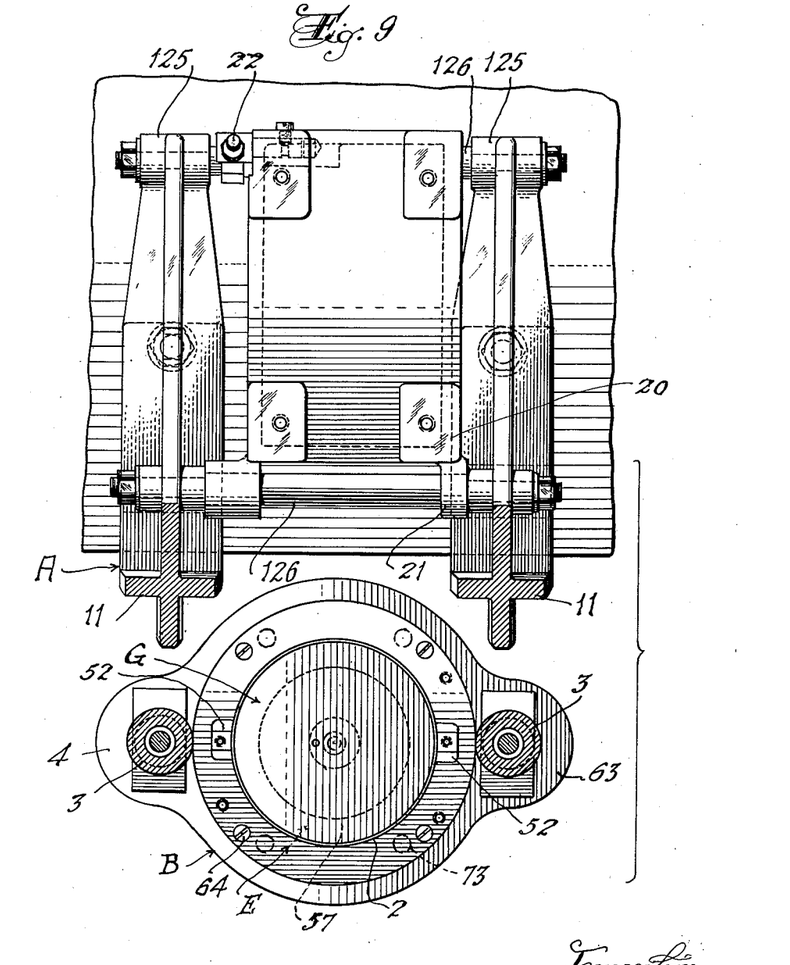
Figure 9 is a horizontal sectional view taken approximately on the plane of the line 9—9 of Figure 1, illustrating the work-holder, the supporting frame and motor mounting, with portions shown in top plan view.
Figure 11:
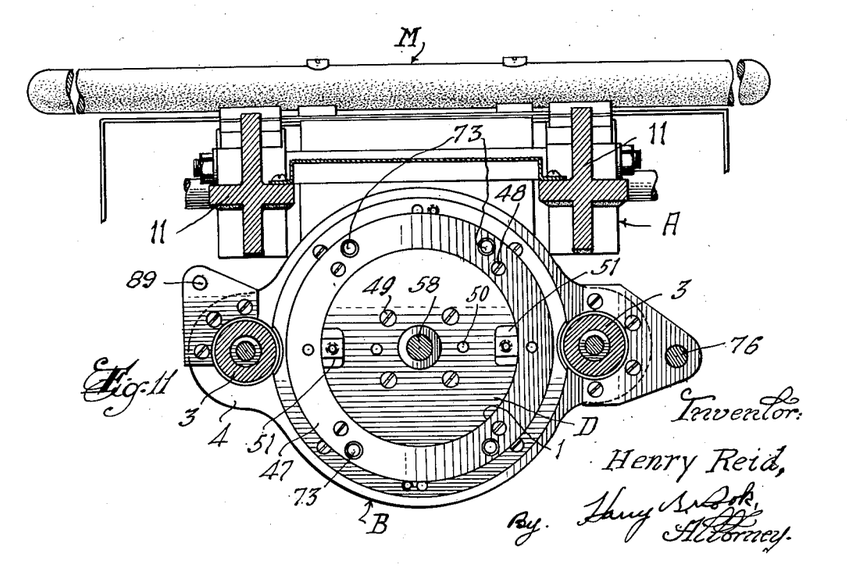
Figure 11 is a horizontal sectional view approximately on the plane of the line 11—11 of Figure 5 and showing a bottom plan view of the trimming punch.

As hereinabove explained, the die E and the work piece are moved into work-operating position by the combined die support and work clamp F of the mounting for which the rack bars 3 form parts, the lower ends of the rack bars having connected thereto a die-carrying ring 63 on which the die E is separably secured by screws 64. A rod 65 is longitudinally slidable in each of the rack bars and the lower ends of said rods project beyond the rack bars and have connected thereto a work holder which includes a crossbar 66 at the center of which is mounted a work-engaging plate 67, said plate being spaced from the crossbar by a spacer sleeve 68 and being separably secured to the crossbar by a screw 69. The rods 65 are normally urged in the direction to move the work holder toward the punch by compression springs 70 mounted on the rods and interposed between guide heads 71 and guide sleeves 72 secured to the lower ends of the rack bars. Movement of the work holder in said direction is normally limited by engagement of the crossbar 66 with the ends of the rack bars, while movement of the die toward the punch is limited by spacer studs 73 projecting from the lower side of the punch carrying plate 47, said spacer studs being shown in Figures 6 and 11 and by dot and dash lines in Figure 9.

Figure 14:
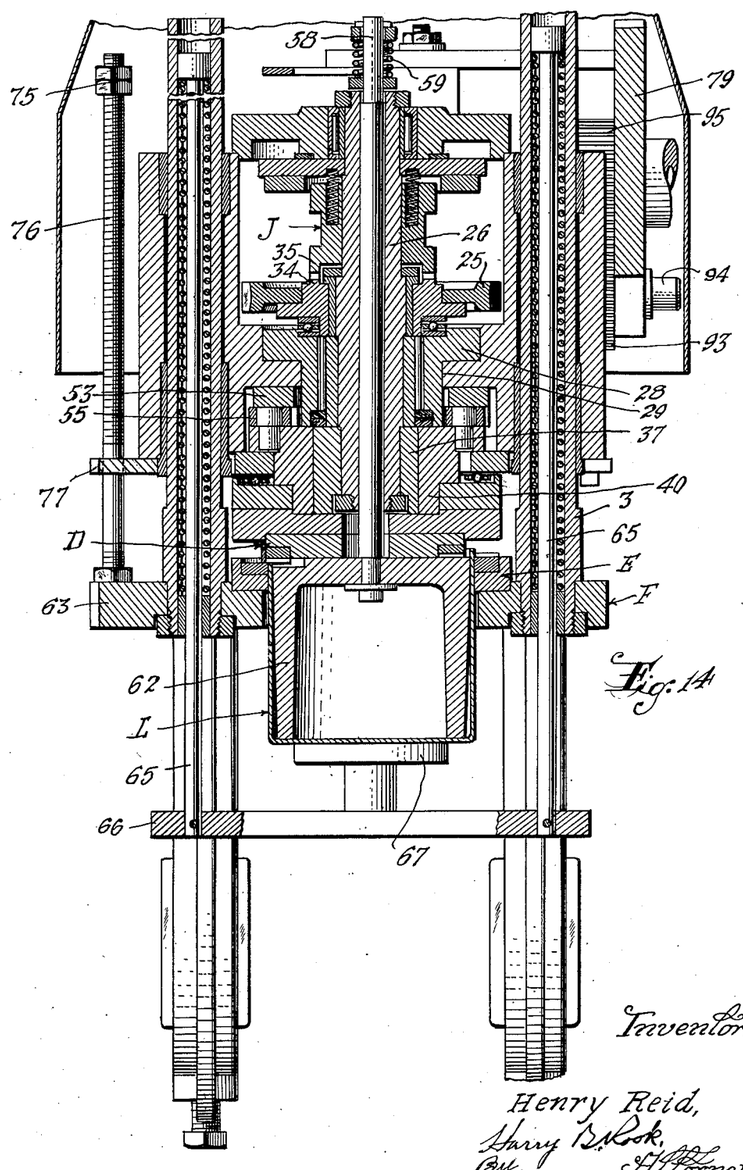
Figure 14 is a longitudinal vertical sectional view similar to Figure 5 but showing the clutch engaged and a work piece of greater depth than that in Figure 5 in process of being trimmed by engagement of the punch and die.
Figure 15:
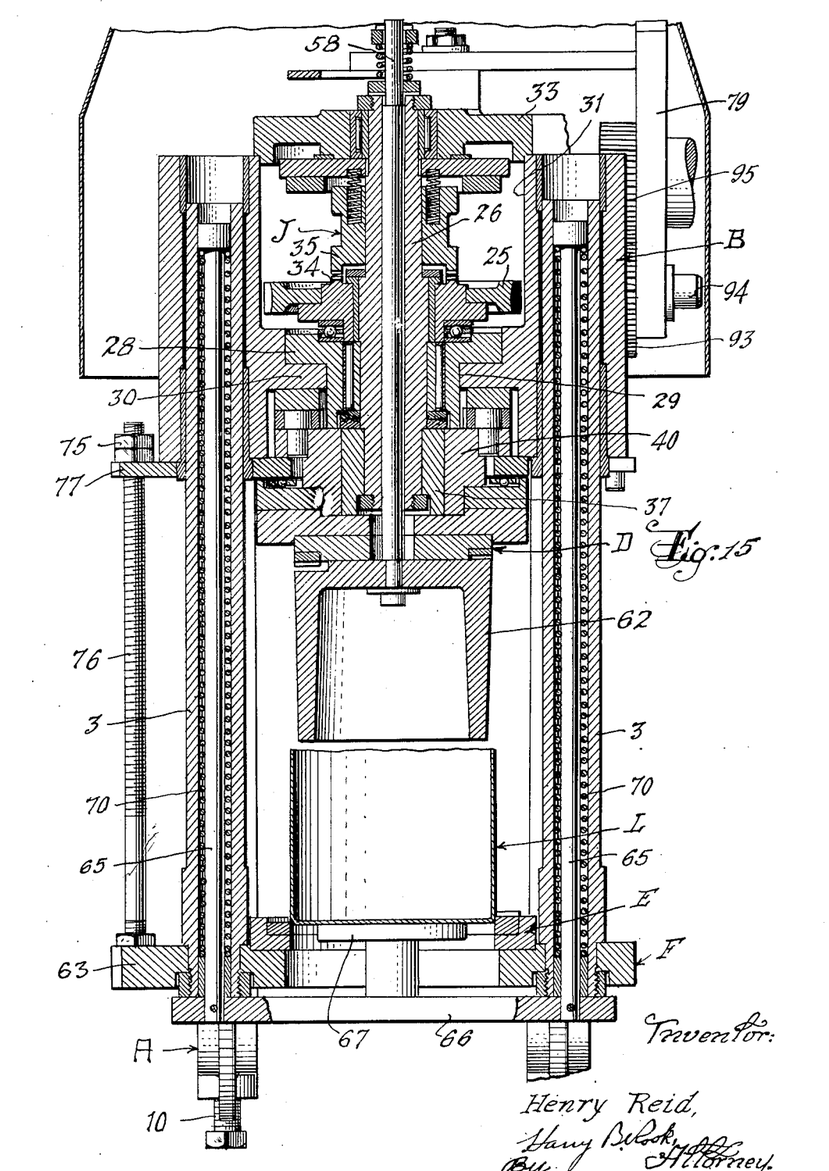
Figure 15 is a view similar to Figure 14 but showing the work head in open position, that is, with the work holder and the die withdrawn from the punch either to receive a work piece for trimming or to discharge a work piece after trimming, and also illustrating the clutch thrown out or disengaged.

The rack bars 3 are actuated by the pinion 7 and the mechanism I to move the combined die support and work clamp toward and away from the punch, and such movement away from the punch is limited by engagement of adjustable nuts 75 on a stop rod 76 with a stop arm 77 at one side of the secondary frame (Figures 14 and 15). When the die support and work clamp are in the open position, the work piece G may be set upon or removed from the work holder. The mechanism I includes a gear segment 79 that is pivotally mounted on a stub shaft 80 mounted in a bearing 80a on the cover. The gear segment has a series of teeth 81 to mesh with the pinion 7 and having a sufficient number of teeth to move the die support and work clamp into work operating position and then to move out of mesh with the pinion 7, when the gear segment is swung upwardly into the position shown in Figure 1. Then the rack bars and die support are locked with the die in work operating relation to the punch as shown in Figures 1, 5, 6 and 14. This lock is shown as comprising two cam surfaces 82 and 83 on a plate 84 fastened on the gear segment 79 that cooperate with a cam follower comprising the respective roller studs 85 and 86 that are mounted on a disk 87 that is secured to one end of the pinion 7. The cam surfaces and roller studs cooperate in such a way as to apply rotative forces to the rack bar gears 5 and at the same time cam-lock said gears, the rack bars and the die E in work-operating position. In other words, the cam surfaces 82 and 83 in effect take the place of one or more gear teeth after the teeth of the series 81 have moved out of mesh with the pinion 7, and at the same time serve as a cam lock which can be readily released when force is applied to the gear segment 79 to move it downwardly in Figure 1.

Figure 1:
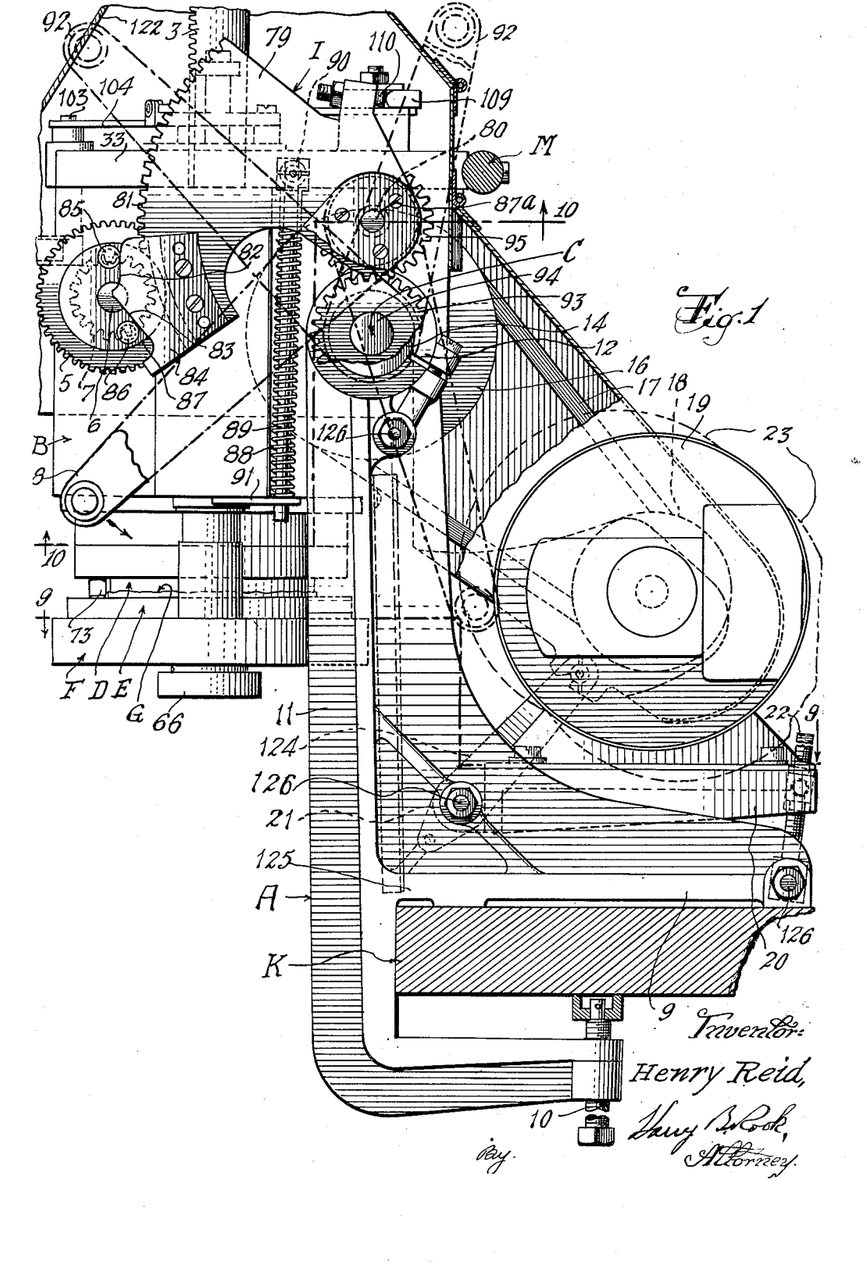
Figure 1 is an elevational view of the righthand side of the machine, when the machine is viewed from the front, embodying the invention with portions of the casing broken away to show the work head, supporting members, motor and a work piece in position about to be trimmed.

The gear segment may be operated automatically but is shown as operated by the crank 8 which is secured by screws 87a to the gear segment, the handle being moved in the direction of the arrow on Figure 1 to actuate the gear segment so as to release the cam lock and move the die support and work clamp away from the punch. Preferably the weight of the rack bars, die and work clamp is in part counter-balanced by a compression spring 88 mounted on a guide rod 89 that is pivotally connected to the gear segment by an arm 90 (Figures 1 and 7), the spring being interposed between said arm and a guide bracket 91 for the rod secured to the secondary frame.

If desired, a crank 92 might be connected to a pinion 93 journaled on a stub shaft 94 that is mounted in the trunnion 14 of the secondary frame, with said pinion 93 meshing with pinion 95 fast connected to the gear segment 79. This selective crank arrangement makes it possible for the operator to mount the crank in the most convenient position for operation.

It will be observed that when the combined work support and die are moved upwardly, the work piece is clamped between the work holder 67 and the filler 57, the work being held in position under the force of the compression springs 70, and when the die support and work clamp are moved away from the punch, the work piece will be ejected from the die by the action of the springs 70 on the work-engaging plate 67 or the work piece will drop by gravity from the punch if it should first be cleared from the die.

Figure 4:
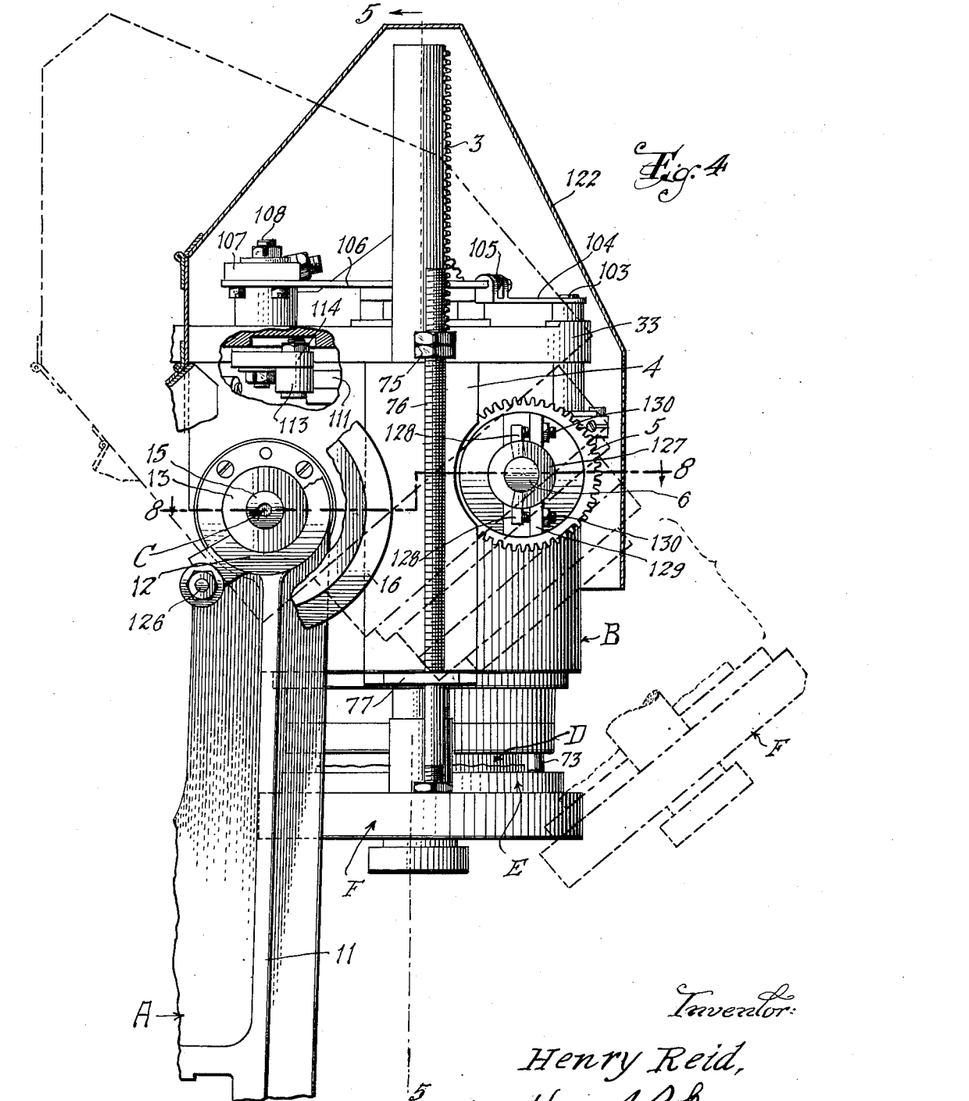
Figure 4 is an elevational view of the lefthand side of the machine with portions broken away and shown in section and illustrating in dot and dash outline the work head in partially open and tilted position to provide ready access for changing of the punch and die, and to permit the work piece to fall from the machine.

By tilting the secondary frame about the axis C as shown by dot and dash lines in Figure 4 the work piece will more readily fall from the machine and the work clamp, die support and punch can be made accessible rapidly and easily for adjustment or replacement.

Figure 2:
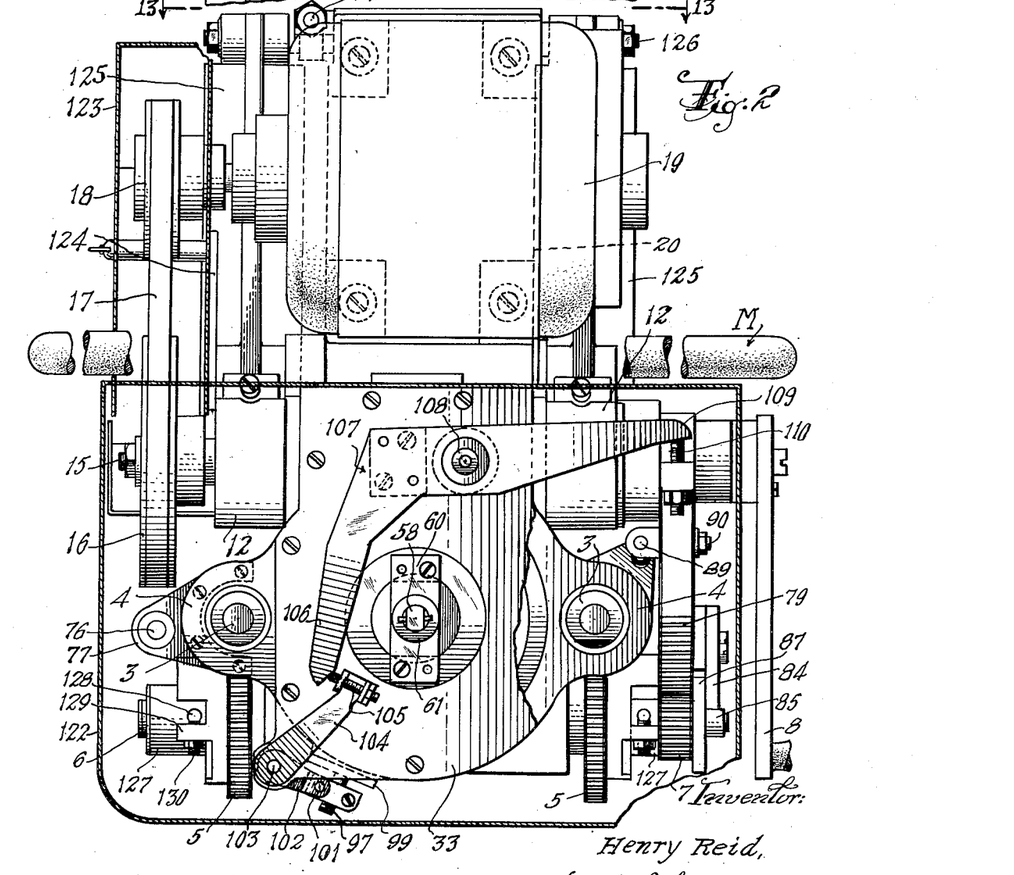
Figure 2 is a top plan view with the casing shown in section, and illustrating the trip mechanism in a position immediately prior to the release of the trip mechanism to start operation of the trimming means.
Figure 3:
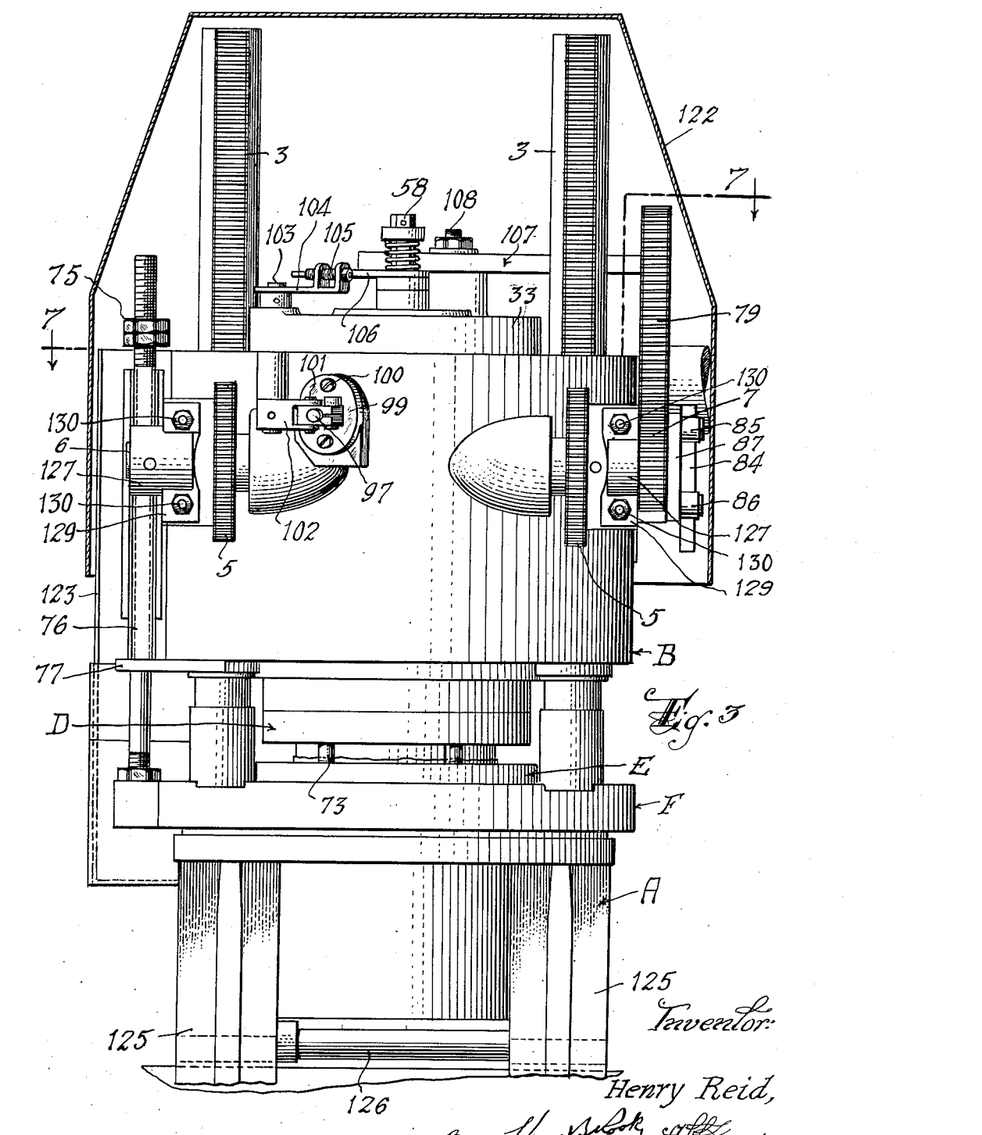
Figure 3 is a front elevational view with the casing shown in section and work piece in trimming position.
Figure 7:
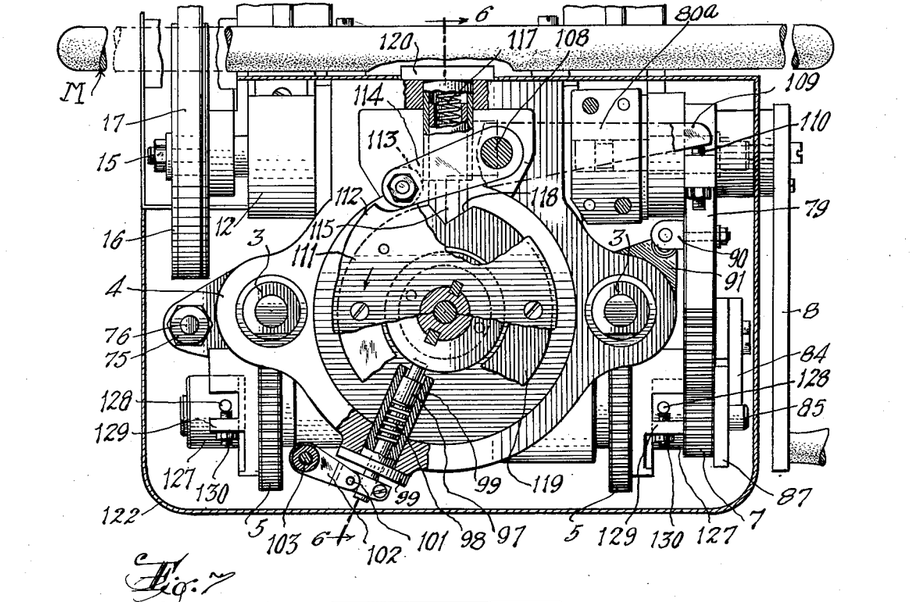
Figure 7 is a partial horizontal sectional view approximately on the plane of the line 7—7 of Figure 3, with portions shown in top plan view and other portions broken away.
Figure 16:
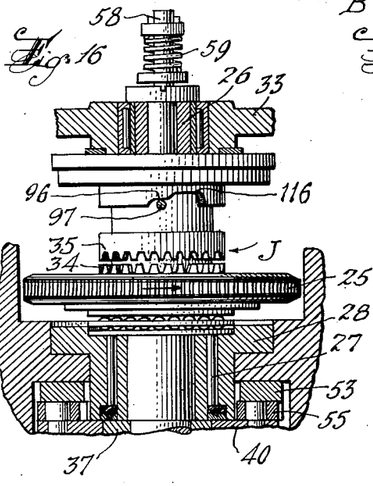
Figure 16 is a composite fragmentary vertical sectional and front elevational view of the clutch members for controlling the starting and stopping of the trimming operation of the machine and illustrating the clutch in open or thrown-out condition.
Figure 17:
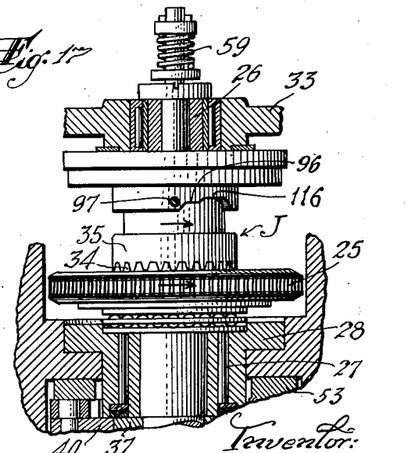
Figure 17 is a similar view showing the clutch in closed or engaged condition.

As hereinbefore described, simultaneously with the clamping of the work piece in work-operating position, the actuation of the punch is started and this result is effected by a mechanism about to be described. The upper clutch element 35 has a horizontal shoulder 96 (Figures 6, 16 and 17) beneath which the nose of a starting pin 97 is normally positioned to hold the clutch elements out of engagement as shown in Figures 16 and 6. Said starting pin is normally influenced into a position beneath said shoulder by a compression spring 98 and the shank of the pin projects from a guide housing 99 that is removably mounted in the secondary frame by screws 100. Said projecting shank of the starting pin is pivotally connected at 101 (Figures 2, 3 and 7) to an arm 102 which is rigidly connected to a stub shaft 103 which is journaled in the cover plate 33 and has another arm 104 (Figures 2 and 3) that carries an adjustable abutment screw 105 which coacts with an arm 106 of a lever 107 which is connected to a stub shaft 108 on said cover plate and has another arm 109 cooperative with an adjustable abutment screw 110 mounted in an extension of the gear segment 79 (Figures 1 and 2). Normally and when the machine is at rest, the nose of the starting pin lies beneath the shoulder 96 of the clutch member and the abutment screw 110 in the gear segment is distantly spaced from the lever arm 109. When the gear segment 79 is actuated to clamp the work piece in work-operating position, the abutment screw 110 is moved toward the lever arm 109, and as the gear segment 79 becomes locked between cam surfaces 82, 83 and the stud rollers 85, 86, the abutment screw 110 engages the lever arm 109 and swings the lever 107 and arms 104 and 102 so as to withdraw the nose of the starting pin from beneath the shoulder 96. The parts are shown in the drawings in the positions assumed just prior to the complete withdrawal of the starting pin as best seen in Figure 6. Upon complete withdrawal of the starting pin, the clutch member 35 is forced into engagement with the clutch member 34 so as to cause rotation of the countershaft 26 and consequent actuation of the punch. The punch is moved through successive cycles, each cycle comprising a plurality of steps in succession in the same direction around the axis of the die, each step consisting of movement of the punch along a straight line to and from a central position concentric with the die. In the present case, the follower being four-sided, there are four steps and the punch is moved along straight lines each perpendicular to one side of the follower. Upon each movement of the punch from the central position, the cutting edge of the punch cooperates with the cutting edge of the die to cut the work, as best shown in Figures 15 and 14, the former of which shows the punch in its central position and the latter of which shows the punch moved to the left from its central position so as to cut the work piece L. This cycle is effected during one complete revolution of the countershaft 26 and rotation of the shaft is automatically stopped at the end of each revolution. This is effected by a cam 111 fast connected to the upper clutch element (Figures 5, 6 and 7). Said cam has a major portion of its periphery concentric with the cam but has a cam lobe 112 which engages a follower roller 113 on an arm 114 which is connected to the stub shaft 108 so that when the cam lobe 112 strikes the follower roller 113, the lever 107 will be actuated to move the starting pin into the position to enter a cut-out or cam portion 116 in the shoulder 96 in such a way that the cam portion will ride upon the pin and elevate the clutch element 35 out of engagement with the clutch element 34 as shown in Figure 16 to thereby stop rotation of the countershaft 26. Thereupon a stop pin 115 having a wedge-shaped nose is projected by a compression spring 117 into a V-shaped notch 118 in a stop ring 119 that is fast secured to the cam 111 (Figures 6 and 7). Preferably the stop pin and its spring are mounted in a housing 120 that is separably attached to the secondary frame by screws 121.

The housings 120 and 99 and the shafts 6 and 16, as well as the cover 33, being removable, the bearing block 28, cam, countershaft 26, gear 25 and the clutch mechanism can be easily removed as a unit from the upper recess 31 of the secondary frame.

Figure 8:
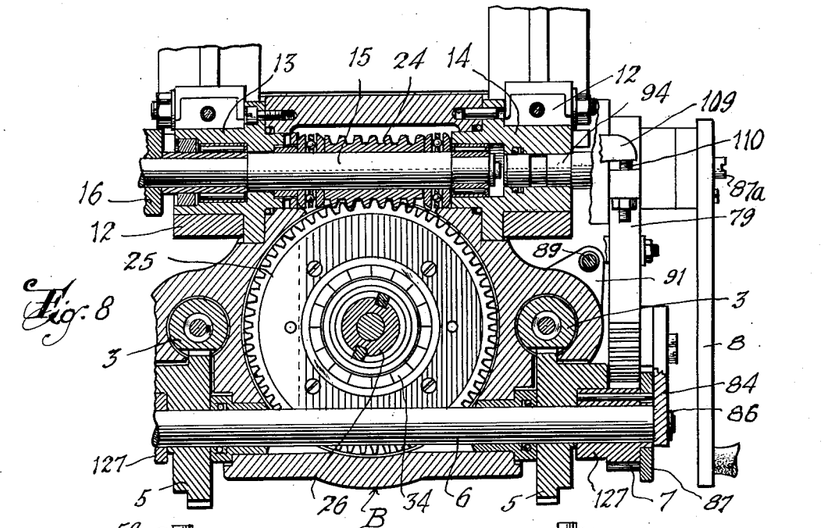
Figure 8 is a fragmentary horizontal sectional view approximately on the plane of the line 8—8 of Figure 4 showing the drive gearing and the work-holder rack-actuating mechanism.

It is desirable to provide some adjustment for the rack bars 3 and gears 5, and accordingly I have shown the gears 5 adjustably mounted on their shaft 6. More particularly, a collar 127 is mounted on the shaft 6 for each gear 5, one collar being pinned to the shaft and the corresponding gear being rotatable on the shaft, while the other gear is pinned to the shaft and its corresponding collar is rotatable on the shaft and fast connected to the pinion 7 (Figure 8). Each collar has a pair of studs 128 and each gear has a lug 129 juxtaposed to each stud. In each lug is adjustably mounted a screw 130 in abutting relation to the corresponding stud 128 so that by adjusting the screws 130, the gears may be adjusted to cause the racks to move in proper relation to each other or elevated in unison to raise the die-carrying ring slightly and compensate for material removed when it becomes necessary to renew the cutting edges of the punch and die.

To facilitate handling of the machine, a handle bar M is fastened to the rear edge of the cover plate 33.

Preferably the upper portion of the secondary frame will be enclosed in a housing 122 and the belt and pulley connection 16, 17, 18 is enclosed within a housing 123 which preferably is pivotally connected to the housing 122 and is supported at its swinging end by a prop 124 (Figure 1).

While the frame structure of the machine may be as desired, it has been shown as comprising two side pieces 125 connected by tie bolts 126.

While the preferred embodiment of the invention has been illustrated for the purpose of explaining the principles of the invention, it will be understood by those skilled in the art that the construction of the machine may be widely modified within the spirit and scope of the invention.

What I claim is:

1. A machine for operating upon a workpiece having an annular wall, comprising a main frame, an elongate vertical secondary frame mounted on said main frame, a punch mounted on the lower end of said main frame to move in its own plane transversely of said secondary frame, a die, said die and punch having coacting portions to receive between them and operate upon said annular wall, driving means for actuating said punch in said plane to cause coaction of said punch and die upon said wall, a combined die support and work clamp beneath said punch, mounting means on said secondary frame providing for movement of said die support and work clamp toward and away from said punch so as to hold a workpiece and said die in work-operating relation to said punch, mechanism including means for applying force to the mechanism to actuate said die support and work clamp into said work-operating position, and a lock for holding said die support and work clamp in said work-operating position upon release of force from said mechanism.

2. A machine for operating upon a workpiece having an annular wall, comprising a main frame, an elongate vertical secondary frame mounted on said main frame, a punch mounted on the lower end of said main frame to move in its own plane transversely of said secondary frame, a die, said die and punch having coacting portions to receive between them and operate upon said annular wall, driving means for actuating said punch in said plane to cause coaction of said punch and die upon said wall, a combined die support and work clamp beneath said punch, mounting means on said secondary frame providing for movement of said die support and work clamp toward and away from said punch so as to hold a workpiece and said die in work-operating relation to said punch, mechanism including means for applying force to the mechanism to actuate said die support and work clamp into said work-operating position, and a cam lock including a cam and a follower for said cam connected to said mounting means for holding said die support and work clamp in said work-operating position upon release of force from said mechanism.

3. A machine as defined in claim 2 wherein said cam is connected to and operated by said mechanism.

4. A machine as defined in claim 2 wherein said mounting means and said mechanism includes rack bars longitudinally slidably mounted in said secondary frame, a horizontal shaft journaled in said secondary frame, a gear on said shaft meshing with each of said rack bars, operating means for rotating said gears, and said connection between said mounting means and said cam follower includes a connection between said cam follower and said horizontal shaft.

5. A machine as defined in claim 4 wherein said operating means for rotating said gears includes a pinion fast connected to said gears, a gear segment pivotally mounted on the secondary frame and meshing with said pinion with a series of teeth to move said die support and work clamp into said work-operating position and then to move out of mesh with said pinion, and said cam follower includes a pair of studs fast connected to said pinion at one end thereof, and said cam comprises cam surfaces on said gear segment beyond one end of said series of teeth to engage said studs after disengagement of said teeth from said pinion and thereby lock said die support and work clamp in said work-operating position.

6. A machine as defined in claim 2 wherein said combined die support and work clamp includes a main section that carries said die and is supported by said mounting means, and a work holder yieldably mounted on said main section to move away from said die in the direction opposite said punch for accommodating work-pieces having annular walls of different heights.

7. A machine as defined in claim 2 wherein said driving means includes a countershaft journaled in said secondary frame coaxially with said punch, a cam follower connected to the upper side of said punch coaxially therewith and having a polygonal opening, guides for said follower, a cam on said countershaft within and coacting with the walls of said opening of said follower, and a driving connection between said countershaft and a prime mover.

8. A machine as defined in claim 6 with the addition of means mounting said secondary frame on said main frame to swing about a horizontal axis so that said punch and combined die support and work clamp can be swung upwardly to permit easy and quick access thereto.

9. A machine as defined in claim 2 with the addition of means mounting said secondary frame on said main frame to swing about a horizontal axis so that said punch and combined die support and work clamp can be swung upwardly to permit easy and quick access thereto.

10. A machine as defined in claim 2 wherein said secondary frame includes a housing which has a recess opening through each of its upper and lower ends and a transverse partition forming a common bottom wall for said recesses, said partition having a hole therethrough coaxial with said recesses, and a bearing block separably secured in said partition and removable through the open end of the upper recess and wherein said driving means includes a countershaft journaled in said bearing block, an annular cam follower connected to the upper side of said punch and guides for said follower in the lower recess, a cam fast connected to said counter shaft within and coacting with said follower, a driving gear rotatable relatively to and coaxially with said countershaft in the upper recess, a driving shaft journaled in said secondary frame and having a driving connection with said gear, clutch mechanism in said upper recess including two relatively movable clutch elements, one connected to said gear and the other fast connected to said countershaft, said bearing block, countershaft, clutch elements and cam being removable as a unit through the open end of the upper recess, and means for causing engagement and disengagement of said clutch elements.

11. A machine as defined in claim 10 wherein the last-named means includes a clutch lever on said secondary frame and a part on said mechanism to coact with the lever to cause engagement of the clutch elements when said combined die support and work clamp is moved to work-operating position, and a cam on said countershaft and a follower for said cam connected to the first-mentioned lever for causing disengagement of said clutch elements.

12. A machine as defined in claim 2 with the addition of means for starting and stopping said driving means including coacting clutch elements for connecting and disconnecting said driving means to and from a prime mover respectively, upon engagement and disengagement of said clutch elements, respectively, a clutch lever on said secondary frame and a part on said mechanism to coact with the lever to cause engagement of the clutch elements when said combined die support and work clamp is moved to work-operating position, and a cam on said countershaft and a follower for said cam connected to the first-mentioned lever for causing disengagement of said clutch elements.

13. A machine as defined in claim 2 wherein said mounting means and said mechanism includes rack bars longitudinally slidably mounted in said secondary frame, a horizontal shaft journaled in said secondary frame, a gear on said shaft meshing with each of said rack bars, operating means for rotating said gears, and said connection between said mounting means and said cam follower includes a connection between said cam follower and said horizontal shaft, and wherein said combined die support and work clamp includes a main section comprising said rack bars connected and a die-carrying ring connected to one end of said rack bars, said rack bars are tubular, a rod is slidable in each rack bar, a work holder is connected to the lower ends of said rods, and springs within said rack bars normally urge said work holder toward said die.

14. A machine as defined in claim 2 wherein said main frame comprises a horizontal base portion and a pair of horizontally spaced vertical standards having horizontal bearings, said secondary frame has trunnions, and journaled in each of said bearings to tiltably mount said secondary frame at least one trunnion has a coaxial opening therethrough, and said driving means includes a drive shaft passing through said opening in said trunnion.

15. A machine as defined in claim 2 wherein said mounting means and said mechanism includes rack bars longitudinally slidably mounted in said secondary frame, a horizontal shaft journaled in said secondary frame, a gear on said shaft meshing with each of said rack bars, operating means for rotating said gears, and said connection between said mounting means and said cam follower comprises a connection between said cam follower and said horizontal shaft, and with the further addition of means for positively limiting movement of said die toward said punch.

References Cited in the file of this patent

UNITED STATES PATENTS

| | | |
|---|---|---|
| 1,389,881 | Kraut | Sept. 6, 1921 |
| 2,212,874 | Brehm | Aug. 27, 1940 |
| 2,521,975 | Hartup | Sept. 12, 1950 |
| 2,669,302 | Brehm | Feb. 16, 1954 |